(12) United States Patent
Ringgenberg (10) Patent No.: US 10,404,383 B2
(45) Date of Patent: Sep. 3, 2019

(54) COMMUNICATING WITH A DOWNHOLE TOOL

(71) Applicant: Halliburton Energy Services, Inc., Houston, TX (US)

(72) Inventor: Paul David Ringgenberg, Frisco, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 322 days.

(21) Appl. No.: 15/318,494

(22) PCT Filed: Jul. 30, 2014

(86) PCT No.: PCT/US2014/048895
§ 371 (c)(1),
(2) Date: Dec. 13, 2016

(87) PCT Pub. No.: WO2016/018308
PCT Pub. Date: Feb. 4, 2016

(65) Prior Publication Data
US 2017/0134101 A1 May 11, 2017

(51) Int. Cl.
*H04B 11/00* (2006.01)
*E21B 47/18* (2012.01)
*E21B 47/16* (2006.01)

(52) U.S. Cl.
CPC .............. *H04B 11/00* (2013.01); *E21B 47/16* (2013.01); *E21B 47/18* (2013.01)

(58) Field of Classification Search
CPC ............. E21B 47/16; E21B 47/18–187; E21B 47/122; E21B 47/14; E21B 47/12;
(Continued)

(56) References Cited

U.S. PATENT DOCUMENTS

| 5,293,937 A | * | 3/1994 | Schultz | .................. E21B 34/06 166/250.01 |
| 5,592,438 A | | 1/1997 | Rorden et al. | |

(Continued)

FOREIGN PATENT DOCUMENTS

WO 2016018308 A1 2/2016

*Primary Examiner* — George S Gray
(74) *Attorney, Agent, or Firm* — John Wustenberg; Parker Justiss, P.C.

(57) ABSTRACT

In one embodiment of this disclosure there is provided a method for communicating with a second downhole tool in a wellbore that extends from a terranean surface. When there is no loss of communicability in a second communications medium between the terranean surface and the second downhole tool, the method comprises transmitting a first communication in the second communication medium from the terranean surface to the second downhole tool. When there is a loss of communicability in the second communications medium, the method comprises transmitting the first communication from the terranean surface to a first downhole tool positioned in the wellbore in a first communication medium different than the second communication medium, translating the first communication from the first to the second communication medium, and transmitting the first communication in the second communication medium from the first to the second downhole tool.

22 Claims, 3 Drawing Sheets

(58) Field of Classification Search
CPC ...... H04B 11/00; H04W 40/12; H04W 84/18; H04W 88/04; Y02D 70/00; Y02D 70/34; Y02D 70/48
See application file for complete search history.

(56) References Cited

U.S. PATENT DOCUMENTS

| | | |
|---|---|---|
| 6,177,882 B1 | 1/2001 | Ringgenberg |
| 2004/0047235 A1 | 3/2004 | Kyle et al. |
| 2004/0124994 A1 | 7/2004 | Oppelt |
| 2011/0164468 A1 | 7/2011 | Robbins et al. |
| 2014/0318787 A1* | 10/2014 | Tirado .................... E21B 43/11 166/297 |

* cited by examiner

COMMUNICATING WITH A DOWNHOLE TOOL

CROSS-REFERENCE TO RELATED APPLICATION

This application is the National Stage of, and therefore claims the benefit of, International Application No. PCT/US2014/048895 filed on Jul. 30, 2014, entitled "COMMUNICATING WITH A DOWNHOLE TOOL," which was published in English under International Publication Number WO 2016/018308/ on Feb. 4, 2016. The above application is commonly assigned with this National Stage application and is incorporated herein by reference in its entirety.

TECHNICAL BACKGROUND

This disclosure relates to a communication system for downhole tools.

BACKGROUND

In a wellbore environment, a tool can lose a capability of communicating via a particular medium or designated technique. For example, an acoustic repeater on the string could malfunction, cutting off acoustic communication between the surface and tools downhole from that repeater. Thus, in some instances, a downhole tool may be effectively cut off from a surface control system once the particular communication medium is lost or disabled.

DETAILED DESCRIPTION

The present disclosure relates to a downhole tool communication system in a wellbore. The communication system is able to translate a communication received via one communication medium (e.g., pressure pulses of wellbore fluid) to a different communication medium (e.g., acoustic stimulation of tubing or other wellbore system component) and transmit the translated communication in that different medium. For example, the communication system can include a downhole translation tool that receives a command for another downhole tool via pressure pulses and then sends that command to the other tool via acoustic stimulation. If the ability to receive communications via a first medium is lost or otherwise compromised, then the communication system can receive communications via a second medium and then transmit the communications to the intended recipient tool using the first medium. The communication media can be any suitable techniques for communicating downhole, such as acoustic stimulation of the tubular, pressure pulses of wellbore fluid, electromagnetic signals (e.g., radio waves), communication through wire, or another communication medium. The translation tool can introduce a time delay between receiving the communication and transmitting it to the downhole tool. For example, the delay could signify to the surface that the communication was successfully received or that a previous communication was successfully executed. The duration of the delay could also signify data to the surface. For example, the duration of the delay could be proportional to a pressure (e.g., the differential pressure across the ball valve).

Various implementations of a downhole tool communication system according to the present disclosure may include none, one or some of the following features. The communication system can mitigate interruption, delay, or malfunction due to communication loss. The communication system provides a method for communicating downhole information to the surface.

Figure 1:
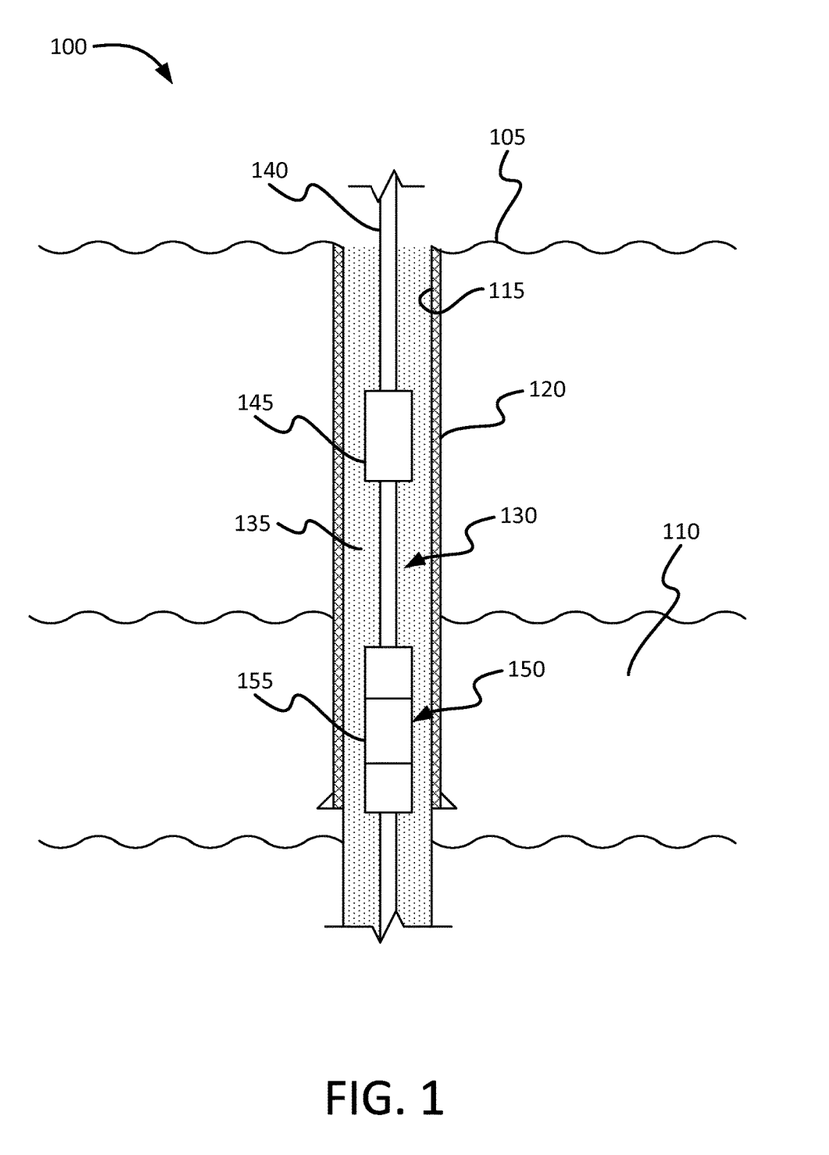
FIG. 1 is a schematic diagram that illustrates an example well system that includes a downhole tool communication system.

FIG. 1 is a schematic diagram that illustrates an example well system 100 that includes a downhole tool communication system including a translation tool 145. The well system 100 is provided for convenience of reference only, and it should be appreciated that the concepts herein are applicable to a number of different configurations of well systems. As shown, the well system 100 includes a downhole working string 140 within a substantially cylindrical wellbore 115 that extends from a terranean surface 105 through one or more subterranean zones 110. The working string 140 can be a tubular system such as a completion string or a drilling string, or another type of downhole string. The wellbore 115 can be an openhole wellbore, a cased wellbore, or a partially cased wellbore. FIG. 1, however, illustrates an implementation in a cased wellbore that includes casing 120.

Moreover, although illustrated as extending from the terranean surface 105 that is above sea-level (e.g., or otherwise not extending from a location that is under a body of water), the wellbore 115 (and well system 100) can be constructed in an ocean-based environment or other environment that includes a body of water. Thus, reference to the terranean surface 105 includes surface locations that are above, as well as below, a body of water (e.g., ocean, sea, lake, river, or otherwise).

FIG. 1 illustrates an implementation of the well system 100 that includes the translation tool 145 as a stand-alone tool in the wellbore 115. In some implementations, however, the translation tool 145 may be part of or integrated with another tool (e.g., a drilling, completion, or production tool). In some implementations, the translation tool 145 may be part of or integrated with a downhole tool string (e.g., working string 140 or otherwise). Further, in some implementations, the translation tool 145 may include or be capable of other functionality beyond that described in the present disclosure, such as drilling, completion, and/or production functionality in addition to translating commands and/or instructions between different communication media or techniques. In some aspects, for example, the drilling, completion, and/or production functionality may be a primary functionality while the translation functionality may be secondary.

In FIG. 1, the wellbore 115 extends substantially vertically from the terranean surface 105. However, in other instances, the wellbore 115 can be of another position, for example, the wellbore 115 deviates horizontally in the subterranean zone, or entirely substantially vertical or slanted. The wellbore 115 may deviate in another manner than horizontal, such as multi-lateral, radiussed, slanted, directional, and/or may be of another position. The volume between the outer surface of the working string 140 and the inner surface of the wellbore 115 defines an annulus 130. The annulus 130 can contain a wellbore fluid 135. The wellbore fluid 135 can be a wellbore fluid such as reservoir fluid, drilling fluid, completion fluid, or another fluid.

The well system 100 also includes a translation tool 145 that is coupled to the working string 140. The translation tool 145 is a tool that receives communications using one first technique (e.g., one communication medium) and transmits communications using a different second technique (e.g., a different communication medium). In some implementations, the translation tool 145 receives communications using the second technique. The well system 100 also includes one or more tool strings, an example shown as tool string 150. Each tool string includes one or more downhole tools, an example shown as downhole tool 155. Downhole tool 155 can be a downhole tool such as a valve, a sampling system, or other downhole tool. For instance, the downhole tool 155 may be a tubing conveyed gun, a TCP gun, a packer, or a downhole valve. As explained in more detail below, an operation that may be performed by these example tools, based on a translated communication from a first medium to a second medium, may include, for example, an initiation of the tubing conveyed gun, a release of the TCP gun, a setting or unsetting of the packer, and/or a modulation of the valve (e.g., a closing of a ball valve, a circulating or opening of a bypass valve to allow communication from the annulus to the tubing string).

FIG. 1 shows tool string 150 downhole of translation tool 145, though in other implementations tool string 150 can be located uphole relative to translation tool 145. In some implementations, the translation tool 145 is included in the tool string 150.

Figure 2:
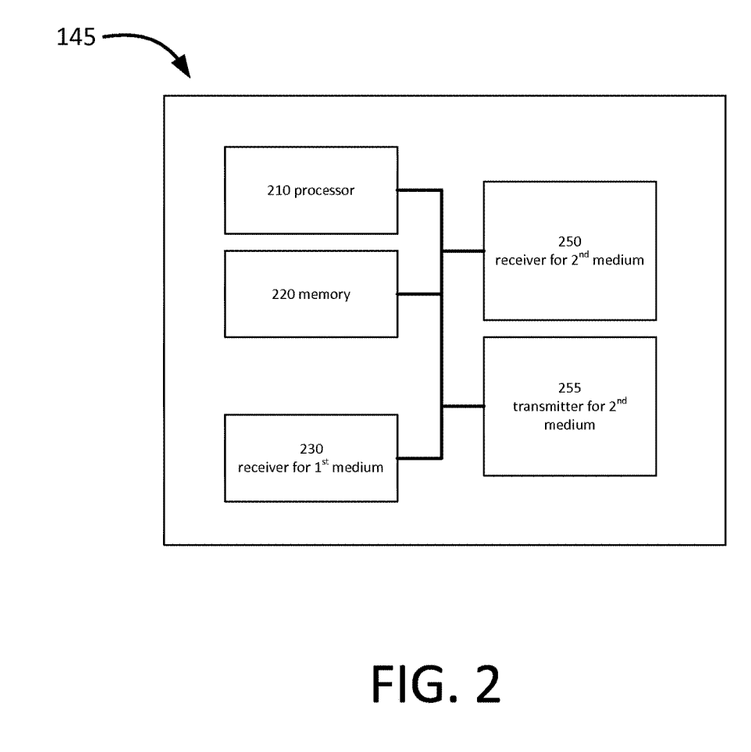
FIG. 2 is a schematic diagram of an example translation tool.

FIG. 2 is a schematic diagram of an example translation tool 145. The translation tool 145 includes a processor 210 and a memory 220. The translation tool 145 also includes a first receiver 230 that receives communications via a first communication medium. The translation tool 145 also includes a second receiver 250 that receives communications via a second communication medium and a transmitter 255 that transmits communications via the second communication medium. The processor module 210 can send commands the receivers 230, 250 or the transmitter 255, process communications, and perform other processing.

The processor 210 can execute instructions, for example, to generate output data based on data inputs. The instructions can include programs, codes, scripts or other types of data stored in memory. Additionally or alternatively, the instructions can be encoded as pre-programmed or re-programmable logic circuits, logic gates, or other types of hardware or firmware components. In some instances, the processor 210 can generate output data by executing or interpreting software, scripts, programs, functions, executables, or other modules stored in the memory 220. The processor 210 can also process transmissions received from receivers 230, 250 or generate transmissions sent by transmitter 255. For example, the processor 210 can translate a communication received by first receiver 230 and send the translated communication to transmitter 255. The processor 210 may perform one or more of the operations shown in FIG. 3 as appropriate.

The memory 220 can include any suitable computer-readable media. The memory 220 can include a volatile memory device, a non-volatile memory device, or both. The memory 220 can include one or more read-only memory devices, random-access memory devices, buffer memory devices, or a combination of these and other types of memory devices. In some instances, one or more components of the memory can be integrated or otherwise associated with another component of the translation tool 145. For example, the memory 220 can store communication addresses of one or more downhole tools (e.g., downhole tool 155).

Figure 3:
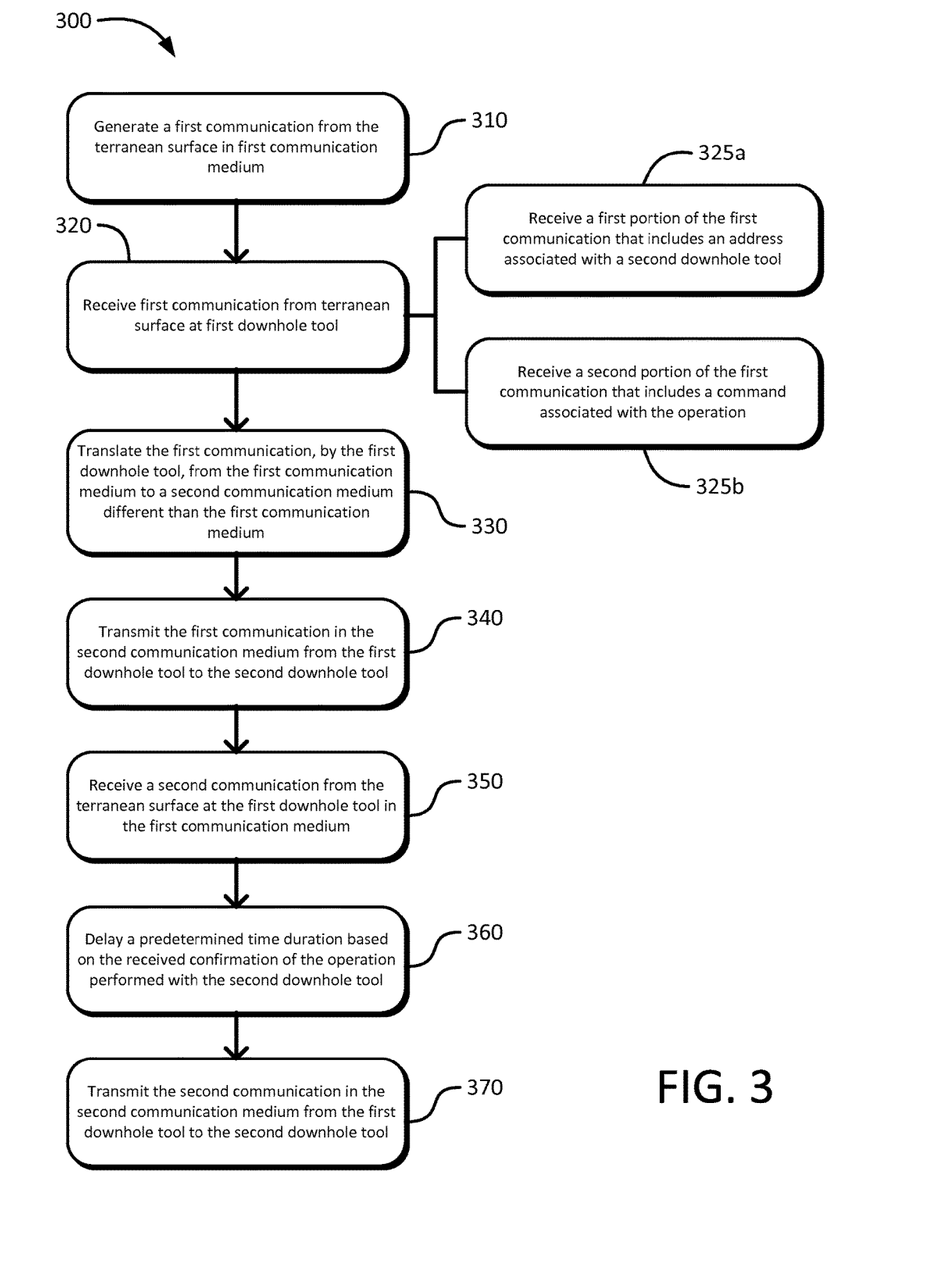
FIG. 3 is a flowchart that illustrates an example process for communicating with a downhole tool.

FIG. 3 is a flowchart that illustrates an example process 300 for communicating with a downhole tool, such as downhole tool 155. The example process 300 can be implemented by one or more components of the well system 100 or by a different type of system. For example, the process 300 can be implemented in part by translation tool 145. The example process 300 shown in FIG. 3 can be modified or reconfigured to include additional, fewer, or different operations, which can be performed in the order shown or in a different order.

At 310, a first communication is generated from the terranean surface. The communication is transmitted downhole via a first communication medium. For example, the first communication medium can be communication via pressure pulses of wellbore fluid. A portion of the communication can be an address, a command, a request for data or information, or another type of communication.

At 320, the first communication is received by a first downhole tool. The first downhole tool can be a downhole tool such as translation tool 145. The first communication is received in the first communication medium. In some implementations, the first communication has a first portion and a second portion. The first portion of the first communication received by the first downhole tool (at 325a) can include an address associated with a second downhole tool (e.g., downhole tool 155). When multiple downhole tools 155 are present in a tool string 150, each tool can have a separate address associated with that tool. A second portion of the first communication received by the first downhole tool (at 325b) can include a command associated with an operation performed with the second downhole tool. In this manner, a communication can transmit a specific command to a specific tool when there are multiple tools or multiple possible commands available.

At 330, the first downhole tool translates the first communication from the first communication medium to a second, different communication medium. For example, the first communication medium can be pressure pulses of the wellbore fluid and the second communication medium can be acoustic stimulation of the well string. For example, the communication from the surface can be intended for the second downhole tool and the first downhole tool can translate the command into a form receivable by the second downhole tool.

At 340, the translated communication is transmitted by the first downhole tool to the second downhole tool. The translated communication is transmitted via the second communication medium. For example, after the translation tool 145 has translated a communication from pressure pulses to acoustic string stimulation (e.g., at 330), the translation tool 145 can transmit the translated communication to the downhole tool 155 via acoustic string stimulation.

At 350, the first downhole tool receives a second communication from the surface in the first communication medium. For example, a second command for the downhole tool 155 could be sent from the surface using acoustic string stimulation. At 360, the first downhole tool translates the second communication into the second communication medium. The first downhole tool can delay a predetermined duration of time before transmitting the translated second communication to the second downhole tool (at 370). The delay can be based on the receipt of a communication transmitted by the second downhole tool. This predetermined delay can signify to the surface that the communication transmitted by the second downhole tool was received by the first downhole tool. For example, after successfully executing a first command transmitted by the translation tool 145, downhole tool 155 could transmit a confirmation signal to the translation tool 145. This signal could signify that the first command was executed successfully.

After receiving a second command transmitted from the surface, the translation tool 145 could delay a predetermined duration of time (e.g., a number of seconds or a number of minutes or another duration) before transmitting the translated second command to the downhole tool 155. The delay between receipt and transmission can signify to the surface that the first command was successfully executed. In some implementations, the first downhole tool can be configured to only introduce a delay on non-emergency functions of the tool. For example, if an instant close command is transmitted from the surface, the first downhole tool will not delay translating and transmitting the command to the second downhole tool. The delay could be introduced on the next non-emergency command received by the first downhole tool.

In other implementations, a delay can signify information such as a value. The value can represent an operating condition or a numerical value, such as a pressure below a closed ball valve, the differential pressure across the ball valve, the pressure within a chamber of another tool, a temperature, or any other downhole data. The duration of the delay can be proportional to or correlated to the value such that the value can be determined at the surface from the duration of the delay. For example, if the well is flowing and a command is transmitted to function the downhole tool 155 to the circulating position, the delay time between the ball valve closing and the circulation ports opening could be a signal of the pressure in the tubing.

In some implementations, the process 300 can be based on a loss of communicability between the second downhole tool in the wellbore and the terranean surface in the second communication medium. For example, downhole communication via the second communication medium could be lost due to damage or malfunction. The first downhole tool can then be used as an intermediate communicator between the surface and the second downhole tool or between multiple downhole tools. Thus the first downhole tool can facilitate communication between the surface and the second downhole tool or between multiple downhole tools.

The features described can be implemented in digital electronic circuitry, or in computer hardware, firmware, software, or in combinations thereof. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In a general implementation, a method for communicating with a downhole tool includes receiving a first communication from a terranean surface at a first downhole tool in a first communication medium, the first downhole tool positioned in a wellbore that extends from a terranean surface; translating the first communication, by the first downhole tool, from the first communication medium to a second communication medium different than the first communication medium based on a loss of communicability between a second downhole tool in the wellbore and the terranean surface in the second communication medium; and transmitting the first communication in the second communication medium from the first downhole tool to the second downhole tool.

A first aspect combinable with the general implementation further includes receiving, in the second communication medium, a confirmation of an operation performed with the second downhole tool based on the transmitted first communication in the second communication medium.

A second aspect combinable with any of the previous aspects further includes receiving a second communication from the terranean surface at the first downhole tool in the first communication medium; delaying a predetermined time duration based on the received confirmation of the operation performed with the second downhole tool; and subsequent to the predetermined time duration, transmitting the second communication in the second communication medium from the first downhole tool to the second downhole tool.

A third aspect combinable with any of the previous aspects further includes translating the second communication, by the first downhole tool, from the first communication medium to the second communication medium.

In a fourth aspect combinable with any of the previous aspects, the first communication medium includes pressure pulses in a fluid disposed in an annulus of the wellbore.

In a fifth aspect combinable with any of the previous aspects, the second communication medium includes acoustic signals through a tubular disposed in the wellbore.

In a sixth aspect combinable with any of the previous aspects, the first communication includes an address associated with the second downhole tool and a command associated with the operation.

In a seventh aspect combinable with any of the previous aspects, receiving the first communication from the terranean surface at the first downhole tool in the first communication medium includes receiving a first portion of the first communication, the first portion including the address; and subsequent to receiving the first portion, receiving a second portion of the first communication, the second portion including the command.

In another general implementation, a downhole communication system includes a first downhole tool configured to receive a first communication from a terranean surface in a first communication medium, and translate the first communication from the first communication medium to a second communication medium different than the first communication medium; and a second downhole tool configured to receive the first communication in the second communication medium based on a loss of communicability between the second downhole tool and the terranean surface in the first communication medium.

In a first aspect combinable with the general implementation, the first downhole tool is further configured to receive, in the second communication medium, a confirmation of an operation performed with the second downhole tool based on the transmitted first communication in the second communication medium.

In a second aspect combinable with any of the previous aspects, the first downhole tool is further configured to receive a second communication from the terranean surface in the first communication medium, and delay transmission of the second communication in the second communication medium to the second downhole tool a predetermined time duration based on the received confirmation of the operation performed with the second downhole tool.

In a third aspect combinable with any of the previous aspects, the first downhole tool is further configured to translate the second communication from the first communication medium to the second communication medium.

In a fourth aspect combinable with any of the previous aspects, the first communication medium includes pressure pulses in a fluid disposed in an annulus of a wellbore.

In a fifth aspect combinable with any of the previous aspects, the second communication medium includes acoustic signals through a tubular disposed in the wellbore.

In a sixth aspect combinable with any of the previous aspects, the first communication includes an address associated with the second downhole tool and a command associated with the operation.

In a seventh aspect combinable with any of the previous aspects, the first communication includes a first portion that includes the address, and a second portion that includes the command.

In another general implementation, a method includes generating a transmission from a terranean surface through a portion of a well system, the transmission including a command to a downhole tool in a first communication type; translating the command from the first communication type to a second communication type different than the first communication type; transmitting the command in the second communication type through another portion of the well system; and performing an operation with the downhole tool based on the command.

In a first aspect combinable with the general implementation, the first communication type includes one or more pressure pulses, and the portion of the well system includes a wellbore fluid that is disposed in an annulus of a wellbore of the well system that extends from a terranean surface.

In a second aspect combinable with any of the previous aspects, the second communication type includes one or more acoustic signals, and the other portion of the well system includes a tubular system disposed in the wellbore.

A third aspect combinable with any of the previous aspects further includes generating a confirmation associated with the operation, the confirmation including one or more acoustic signals.

A fourth aspect combinable with any of the previous aspects further includes generating a second transmission from the terranean surface, the second transmission including a second command to the downhole tool defined by one or more pressure pulses in the wellbore fluid; delaying a particular time duration based on the confirmation associated with the operation; and subsequent to the particular time duration, translating the second command from the one or more pressure pulses to one or more acoustic signals and transmitting the second command with the one or more acoustic signals through the tubular system to the downhole tool.

In a fifth aspect combinable with any of the previous aspects, the wellbore fluid disposed in the annulus of the wellbore includes a completion fluid or a drilling fluid, and the tubular system includes a completion string or a drilling string.

In a sixth aspect combinable with any of the previous aspects, the transmission further includes an address associated with the downhole tool.

A number of implementations have been described. Nevertheless, it will be understood that various modifications may be made. For example, example operations, methods, and/or processes described herein may include more steps or fewer steps than those described. Further, the steps in such example operations, methods, and/or processes may be performed in different successions than that described or illustrated in the figures. As another example, although certain implementations described herein may be applicable to tubular systems (e.g., drillpipe and/or coiled tubing), implementations may also utilize other systems, such as wireline, slickline, e-line, wired drillpipe, wired coiled tubing, and otherwise, as appropriate. For instance, some implementations may utilize a wireline system for certain communications and a casing tubular system for other communications, in combination with a fluid system. Accordingly, other implementations are within the scope of the following claims.

What is claimed is:

1. A method for communicating with a second downhole tool in a wellbore that extends from a terranean surface, comprising:
   when there is no loss of communicability in a second communication medium between the terranean surface and the second downhole tool, transmitting a first communication in the second communication medium from the terranean surface to the second downhole tool; and
   when there is a loss of communicability in the second communication medium between the terranean surface and the second downhole tool, the method further comprises:
      transmitting the first communication from the terranean surface to a first downhole tool positioned in the wellbore in a first communication medium different from the second communication medium;
      translating the first communication, by the first downhole tool, from the first communication medium to the second communication medium; and
      transmitting the first communication in the second communication medium from the first downhole tool to the second downhole tool.

2. The method of claim 1, further comprising receiving, in the second communication medium, a confirmation of an operation performed with the second downhole tool based on the transmitted first communication in the second communication medium.

3. The method of claim 2, further comprising:
   receiving a second communication from the terranean surface at the first downhole tool in the first communication medium;
   delaying a predetermined time duration based on the received confirmation of the operation performed with the second downhole tool; and
   subsequent to the predetermined time duration, transmitting the second communication in the second communication medium from the first downhole tool to the second downhole tool.

4. The method of claim 3, further comprising translating the second communication, by the first downhole tool, from the first communication medium to the second communication medium.

5. The method of claim 1, wherein the first communication medium comprises pressure pulses in a fluid disposed in an annulus of the wellbore.

6. The method of claim 5, wherein the second communication medium comprises acoustic signals through a tubular disposed in the wellbore.

7. The method of claim 1, wherein the first communication comprises an address associated with the second downhole tool and a command associated with an operation performed with the second downhole tool based on the first communication in the second communication medium.

8. The method of claim 7, wherein receiving the first communication from the terranean surface at the first downhole tool in the first communication medium comprises:
   receiving a first portion of the first communication, the first portion comprising the address; and
   subsequent to receiving the first portion, receiving a second portion of the first communication, the second portion comprising the command.

9. A downhole communication system, comprising:
   a first downhole tool positioned in a wellbore that extends from a terranean surface; and
   a second downhole tool positioned in the wellbore, wherein:
      when there is no loss of communicability in a second communication medium between the terranean surface and the second downhole tool, the second downhole tool is configured to receive a first communication in the second communication medium from the terranean surface to the second downhole tool; and
      when there is a loss of communicability in the second communication medium between the terranean surface and the second downhole tool, the first downhole tool is configured to:
         receive the first communication in a first communication medium different from the second communication medium from the terranean surface;
         translate the first communication from the first communication medium to the second communication medium; and
         transmit the first communication in the second communication medium from the first downhole tool to the second downhole tool.

10. The downhole communication system of claim 9, wherein the first downhole tool is further configured to receive, in the second communication medium, a confirmation of an operation performed with the second downhole tool based on the transmitted first communication in the second communication medium.

11. The downhole communication system of claim 10, wherein the first downhole tool is further configured to receive a second communication from the terranean surface in the first communication medium, and delay transmission of the second communication in the second communication medium to the second downhole tool a predetermined time duration based on the received confirmation of the operation performed with the second downhole tool.

12. The downhole communication system of claim 11, wherein the first downhole tool is further configured to translate the second communication from the first communication medium to the second communication medium.

13. The downhole communication system of claim 9, wherein the first communication medium comprises pressure pulses in a fluid disposed in an annulus of the wellbore.

14. The downhole communication system of claim 13, wherein the second communication medium comprises acoustic signals through a tubular disposed in the wellbore.

15. The downhole communication system of claim 9, wherein the first communication comprises an address associated with the second downhole tool and a command associated with an operation performed with the second downhole tool based on the first communication in the second communication medium.

16. The downhole communication system of claim 15, wherein the first communication comprises a first portion that comprises the address, and a second portion that comprises the command.

17. A method, comprising:
   when there is no loss of communicability in a second communication type between a terranean surface and a second downhole tool in a wellbore that extends from the terranean surface, transmitting a first communication in the second communication type from the terranean surface to the second downhole tool; and when there is a loss of communicability in the second communication type between the terranean surface and the second downhole tool, the method further comprises:
- transmitting the first communication from the terranean surface through a portion of a well system to a first downhole tool in the wellbore, the first communication comprising a command to the first downhole tool in a first communication type different from the second communication type;
- translating the command from the first communication type to a second communication type different than the first communication type;
- transmitting the command in the second communication type through another portion of the well system from the first downhole tool to the second downhole tool; and
- performing an operation with the second downhole tool based on the command.

18. The method of claim 17, wherein the first communication type comprises one or more pressure pulses, and the portion of the well system comprises a wellbore fluid that is disposed in an annulus of the wellbore of the well system that extends from the terranean surface, and
- the second communication type comprises one or more acoustic signals, and the other portion of the well system comprises a tubular system disposed in the wellbore.

19. The method of claim 18, further comprising:
- generating a confirmation by the second downhole tool associated with the operation, the confirmation comprising one or more acoustic signals.

20. The method of claim 19, further comprising:
- generating a second transmission from the terranean surface, the second transmission comprising a second command to the first downhole tool defined by one or more pressure pulses in the wellbore fluid;
- delaying a particular time duration based on the confirmation associated with the operation; and
- subsequent to the particular time duration, translating the second command from the one or more pressure pulses to one or more acoustic signals and transmitting the second command with the one or more acoustic signals through the tubular system to the second downhole tool.

21. The method of claim 18, wherein the wellbore fluid disposed in the annulus of the wellbore comprises a completion fluid or a drilling fluid, and the tubular system comprises a completion string or a drilling string.

22. The method of claim 18, wherein the first communication further comprises an address associated with the second downhole tool.

* * * * *

UNITED STATES PATENT AND TRADEMARK OFFICE
CERTIFICATE OF CORRECTION

PATENT NO. : 10,404,383 B2
APPLICATION NO. : 15/318494
DATED : September 3, 2019
INVENTOR(S) : Paul David Ringgenberg Page 1 of 1

It is certified that error appears in the above-identified patent and that said Letters Patent is hereby corrected as shown below:

In the Claims

In Claim 17, Column 11, Lines 12-13, after --second communication type-- delete "different than the first communication type"

Signed and Sealed this
Nineteenth Day of November, 2019

Andrei Iancu
*Director of the United States Patent and Trademark Office*